United States Patent
Kovacevic et al.

(10) Patent No.: US 9,275,468 B2
(45) Date of Patent: Mar. 1, 2016

(54) FALLBACK DETECTION IN MOTION ESTIMATION

(71) Applicant: Intel Corporation, Santa Clara, CA (US)

(72) Inventors: Vladimir Kovacevic, Pancevo (RS); Zdravko Pantic, Belgrade (RS); Aleksandar Beric, Eindhovenn (NL); Milos Markovic, Beograd (RS); Vladimir Ilic, Novi Beograd (RS)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 14/252,944

(22) Filed: Apr. 15, 2014

(65) Prior Publication Data

US 2015/0294479 A1 Oct. 15, 2015

(51) Int. Cl.
*G06K 9/46* (2006.01)
*G06T 7/20* (2006.01)
*G06K 9/52* (2006.01)
*G06K 9/62* (2006.01)

(52) U.S. Cl.
CPC ... *G06T 7/20* (2013.01); *G06K 9/46* (2013.01); *G06K 9/52* (2013.01); *G06K 9/6215* (2013.01); *G06K 2009/4666* (2013.01)

(58) Field of Classification Search
None
See application file for complete search history.

(56) References Cited

U.S. PATENT DOCUMENTS

| 7,471,809 | B2 * | 12/2008 | Miyazaki | G01C 11/06 382/107 |
| 8,000,392 | B1 * | 8/2011 | Krupiczka | H04N 19/56 375/240.12 |
| 8,184,200 | B1 * | 5/2012 | Biswas | H04N 7/014 348/443 |
| 8,295,607 | B1 * | 10/2012 | Biswas | G06T 7/0085 382/192 |
| 8,340,189 | B1 | 12/2012 | Krupiczka et al. | |
| 8,600,178 | B1 * | 12/2013 | Woodall | H04N 19/00593 382/236 |
| 8,792,559 | B2 * | 7/2014 | Robertson | G06T 7/2026 375/240.12 |
| 2007/0285579 | A1 | 12/2007 | Hirai et al. | |
| 2008/0212676 | A1 | 9/2008 | Liu et al. | |

(Continued)

FOREIGN PATENT DOCUMENTS

EP 2207139 A1 * 7/2010 ............. G06T 7/206

OTHER PUBLICATIONS

Argyriou, V. et al., "Motion Estimation Using Quad-Tree Phase Correlation", IEEE International Conference, vol. 1, Surrey University, Guildford, UK, 2005, 4 pages.

(Continued)

*Primary Examiner* — Tsung-Yin Tsai
(74) *Attorney, Agent, or Firm* — Green, Howard & Mughal LLP

(57) ABSTRACT

Techniques related to managing the use of motion estimation in video processing are discussed. Such techniques may include determining dividing two video frames each into corresponding regions, generating phase plane correlations for the corresponding regions, determining whether the video frames are motion estimation correlated based on the phase plane correlations, and providing a video frame prediction mode indicator based on the determination.

22 Claims, 7 Drawing Sheets

(56) References Cited

U.S. PATENT DOCUMENTS

| | | | |
|---|---|---|---|
| 2009/0167958 A1 | 7/2009 | Wredenhagen | |
| 2011/0109803 A1* | 5/2011 | Sharlet | H04N 5/145 348/607 |
| 2011/0255599 A1 | 10/2011 | Sartor et al. | |
| 2011/0268179 A1* | 11/2011 | Diggins | H04N 5/145 375/240.02 |
| 2012/0162439 A1* | 6/2012 | Deng | H04N 7/0115 348/180 |
| 2012/0230580 A1* | 9/2012 | Knee | H04N 13/0003 382/154 |
| 2013/0121416 A1 | 5/2013 | He et al. | |
| 2014/0254678 A1* | 9/2014 | Beric | H04N 19/513 375/240.14 |

OTHER PUBLICATIONS

Tekalp, A.M., "Digital Video Processing", Prentice-Hall Signal Processing Series, 1995, Prentice-Hall, Inc., Simon and Schuster Company, Upper Saddle River, NJ, USA, 375 pages.

Beric, Aleksander, "Video Post Processing Architectures", Technische Universiteit Eindhoven, 2008, 184 pages.

International Search Report and Written Opinion mailed Jun. 19, 2015 for PCT Application No. PCT/US2015/022542.

* cited by examiner

FALLBACK DETECTION IN MOTION ESTIMATION

BACKGROUND

Motion estimation of video sequences is an important component in video processing techniques such as frame rate up-conversion (FRC) and video compression. For example, frame rate up-conversion may provide for additional frames in a video sequence (e.g., frames added between existing frames) to improve video quality. For example, frame rate up-conversion may be used for improved smoothness and judder (e.g., telecine judder) removal in video sequences. Video compression may be used to reduce the size of video data for storage in memory or transmission to another device or the like. For example, a video sequence may be compressed, in part by predicting frames using motion estimation and motion compensation techniques, to use less memory in a device, particularly handheld devices, or to use less bandwidth over a communications medium.

However, FRC and video compression may cause unpleasant artifacts in frames generated or compressed using motion estimation and motion compensation techniques. Such artifacts can degrade user experience during video playback. Artifacts may include, for example, blocking artifacts, edge or boundary artifacts, or noise or the like. Such artifacts may be more prevalent in certain video contexts such as during scene changes, when no or very little motion is present, during fast motion scenes, or in visually complicated scenes.

As such, existing techniques do not provide for high quality, artifact free video sequences when motion estimation and/or motion compensation are applied. Such problems may become critical as video processing and playback becomes more prevalent in a wide array of devices.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
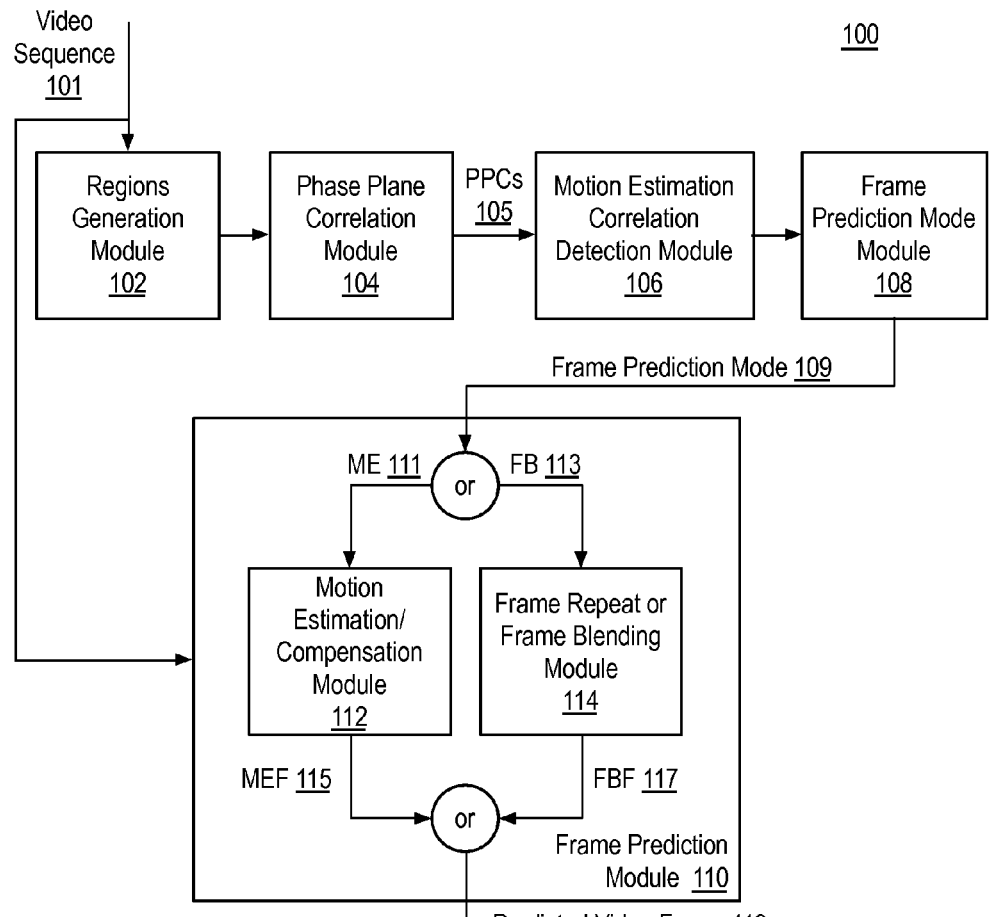
FIG. 1 is an illustrative diagram of an example system for managing motion estimation in video processing.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to managing motion estimation in video processing.

As described above, it may be advantageous to provide frame rate up-conversion (FRC) or video compression in various implementations. As discussed, frame rate up-conversion may provide additional video frames (e.g., interpolated video frames) to a video sequence to improve video quality and video compression may predict video frames (e.g., predicted video frames) in a video sequence to reduce the size of the video data for storage or transmission or the like. Also as discussed, in some examples, FRC or video compression may cause unpleasant artifacts in frames generated or compressed using motion estimation and motion compensation techniques that can degrade user experience during video playback.

In some embodiments, managing motion estimation in video processing may include determining whether video frames are motion estimation correlated. If the video frames are motion estimation correlated, it may be advantageous to predict a video frame between the video frames (e.g., for FRC) or to predict one of the video frames (e.g., based on the other frame for compression) using motion estimation and motion compensation techniques. If the video frames are not motion estimation correlated, it may be advantageous to predict a video frame using a fallback or default technique or not at all. For example, in a fallback mode, FRC frames may be created using a blending of the video frames or a repeated usage of one of the video frames or the like. In video compression in a fallback mode, the video frame may not be predicted, it may be predicted using other techniques (e.g., intra-frame prediction) or it may be motion estimation and compensation predicted based on another video frame, for example.

In an embodiment, managing motion estimation in video processing may include dividing video frames (e.g., two video frames of a video sequence) into corresponding regions. The regions may be global regions or local regions or the like. In some examples the video frames may be divided into both global regions and local regions. Phase plane correlations may be generated for each of the corresponding pairs of regions. The phase correlations may be analyzed (e.g., peaks of the phase plane correlations may be evaluated) to determine whether the video frames are motion estimation correlated. A variety of techniques for determining whether the video frames are motion estimation correlated are discussed further herein. A video frame prediction mode indicator may be provided based on the determination of whether the video frames are motion estimation correlated. For example, the video frame prediction mode indicator may indicate one of true or false, motion estimation mode or fallback mode, or the like.

FIG. 1 is an illustrative diagram of an example system 100 for managing motion estimation in video processing, arranged in accordance with at least some implementations of the present disclosure. System 101 may implement a method (e.g., via a computer or other device) for managing motion estimation in video processing. As shown in FIG. 1, system 100 may include a regions generation module 102, a phase plane correlation module 104, a motion estimation correlation detection module 106, a frame prediction mode module 108, and a frame prediction module 110. As shown, regions generation module 102 and/or frame prediction module 110 (and other modules of system 100 as needed) may receive a video sequence 101. Video sequence 101 may include any suitable video sequence of video frames. Video sequence 101 may be received from any suitable source such as memory, a video capture device (e.g., video camera, camcorder, or the like), another device, or the like. Video sequence may include any suitable resolution such as video graphics array (VGA), high definition (HD), Full-HD (e.g., 1080 p), 4K resolution image, or the like.

Figure 2:
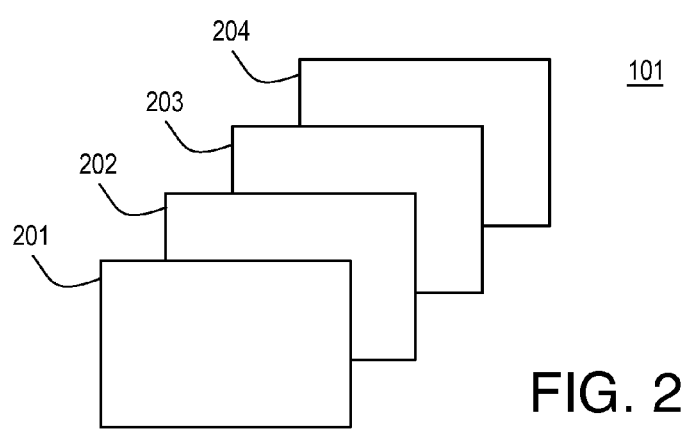
FIG. 2 illustrates an example portion of a video sequence.

FIG. 2 illustrates an example portion of video sequence 101, arranged in accordance with at least some implementations of the present disclosure. As shown in FIG. 2, video sequence 101 may include a sequence of video frames 201-204. Although illustrated with four video frames 201-204, video sequence 101 may include any number of video frames.

As discussed, video frames 201-204 may be any suitable resolution. In some examples, video frames 201-204 may be provided temporally such that video sequence 101 may be viewed in the order of video frames 201-204. As discussed herein, a determination may be made as to whether any two of video frames 201-204 are motion estimation correlated. In an embodiment, the analyzed video frames may be temporally adjacent or succeeding frames such as video frames 201, 202, video frames 202, 203, and so on. In other embodiments, the analyzed video frames may skip a video frame and may include, for example, video frames 201, 203, video frames 202, 204, and so on. In yet other embodiments, the analyzed video frames may have additional gaps between them. Further, the video frames may be analyzed in the forward direction (e.g., in a temporal direction of viewing) or in the backward direction (e.g., opposite a temporal direction of viewing).

Figure 3:
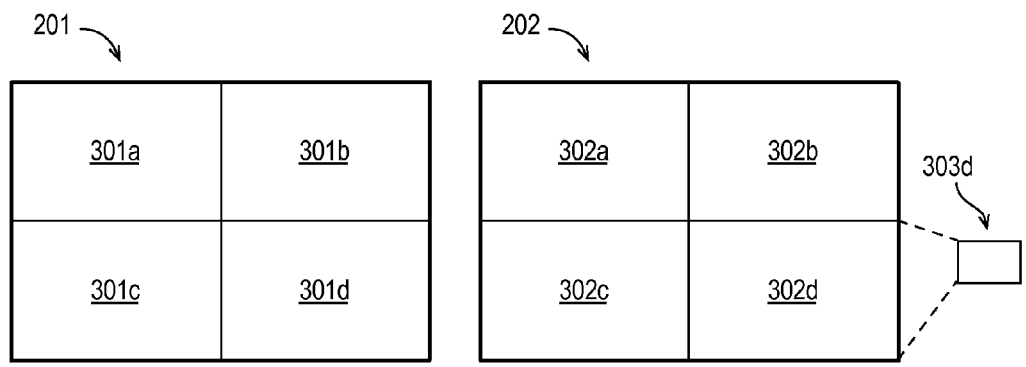
FIG. 3 illustrates example regions of example video frames.
Figure 4:
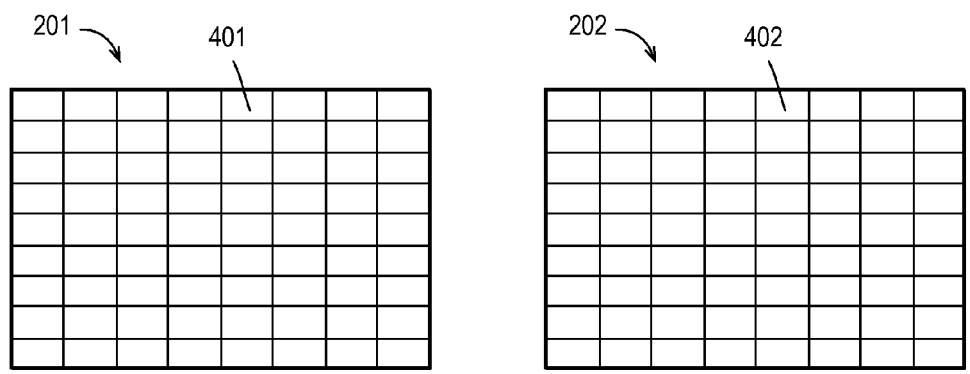
FIG. 4 illustrates example regions of example video frames.

Returning to FIG. 1, regions generation module 102 may receive video sequence 101 and may divide video frame 201 and video frame 202 into corresponding regions as is illustrated further in FIGS. 3 and 4. The discussed techniques are described herein with respect to video frames 201, 202 for the sake of clarity of presentation, but the techniques may be applied to any video frames of video sequence 101 as discussed.

FIG. 3 illustrates example regions 301, 302 of example video frames 201, 202, arranged in accordance with at least some implementations of the present disclosure. As shown in FIG. 3, video frame 201 may be divided into regions 301a, 301b, 301c, and 301d and video frame 202 may be divided into corresponding regions 302a, 302b, 302c, and 302d. For example, regions 301 and regions 302 may correspond due to being in the same or substantially the same location of video frame 201 and video frame 202, respectively. In some examples, regions 301, 302 may be global regions of video frames 201, 202.

FIG. 4 illustrates example regions 401, 402 of example video frames 201, 202, arranged in accordance with at least some implementations of the present disclosure. In the illustration of FIG. 4, only one of regions 401 and one of regions 402 are illustrated for the sake of clarity of presentation. As shown in FIG. 4, video frame 201 may be divided into regions 401 and video frame 202 may be divided into corresponding regions 402. For example, regions 401 and regions 402 may correspond due to being in the same or substantially the same location of video frame 201 and video frame 202, respectively. In some examples, regions 401, 402 may be local regions of video frames 201, 202.

In various embodiments, regions generation module 101 may generate regions 301, 302 or regions 401, 402, or both. As discussed, in some embodiments regions 301 may be considered global regions (e.g., larger regions associated with global motion between video frame 201 and video frame 202) and regions 401 may be considered local regions (e.g., small regions associated with location motion between video frame 201 and video frame 202).

In an embodiment, regions 301, 302 may include four regions; however, regions 301, 302 may include any suitable number of regions such that motion between video frames 201, 202 may be evaluated as discussed further herein. For example, regions 301, 302 may be used to evaluate global motion between video frames 201, 202. In other embodiments, regions 301 and regions 302 may include six regions or eight regions or the like. In an embodiment, video sequence 101 is a 1080$p$ video sequence and regions 301, 302 each include four regions in a 2 by 2 pattern (as shown in FIG. 3) of 1024 by 512 pixels. In various examples, regions 301 and regions 302 may align at their borders, overlap in either the horizontal direction, the vertical direction or both, or gaps may be provided between the regions in either the horizontal direction, the vertical direction or both.

Also as shown in FIG. 3, regions 301 and regions 302 may be downscaled to generate downscaled regions such as, for example, a downscaled region 303d associated with region 302d. The downscaling of regions 301, 302 may include any suitable downscaling for increasing processing time or saving power such as a downscaling factor of 1 to 8 or the like. For example, if the downscaling factor is 1, downscaling may be skipped. The techniques discussed herein may be applied to either regions 301, 302 or their associated downscaled regions. As discussed, in some examples, regions generation module 101 may only generate regions 301, 302.

Returning to FIG. 4, in an embodiment, regions 401, 402 may include 72 regions; however, regions 401, 402 may include any suitable number of regions such that motion between video frames 201, 202 may be evaluated as discussed further herein. For example, regions 401, 402 may be used to evaluate local motion between video frames 201, 202. In other embodiments, regions 401, 402 may include thirty to 120 regions or the like. In an embodiment, video sequence 101 is a 1080 p video sequence and regions 401 and regions 402 each include 72 regions in a 8 by 9 pattern (as shown in FIG. 4) of 256 by 128 pixels. In various examples, regions 401 and regions 402 may align at their borders, overlap in either the horizontal direction, the vertical direction or both, or gaps may be provided between the regions in either the horizontal direction, the vertical direction or both.

Also, as discussed with respect to FIG. 3, regions 401 and regions 402 may be downscaled to generate downscaled regions (not shown). The downscaling of regions 401, 402 may include any suitable downscaling for increasing processing time or saving power such as a downscaling factor of 1 to 2 or the like. For example, if the downscaling factor is 1, downscaling may be skipped. The techniques discussed herein may be applied to either regions 401, 402 or their associated downscaled regions. As discussed, in some examples, regions generation module 101 may only generate regions 401, 402.

Returning to FIG. 1, regions 301, 302 and/or regions 401, 402 may be transferred from regions generation module 101 to phase plane correlation module 104. Phase plane correlation module 104 may generate phase plane correlations (PPCs) 105 such that a phase plane correlation of phase plane correlations 105 is generated for a corresponding pair of regions. For example, phase plane correlations 105 may include a phase plane correlation for (or between) region 301a and region 302a, a phase plane correlation for (or between) region 302a and region 302c, and so on for each pair (or at least some pairs) of corresponding regions 301 and regions 302.

Similarly, phase plane correlations 105 may include a phase plane correlation for (or between) each pair (or some pairs) of corresponding regions 401, 402. In various examples, phase plane correlation module 104 may generate phase plane correlations for regions 301 and corresponding regions 302 or regions 401 and corresponding regions 402 or both. Furthermore, in some examples, phase plane correlation module 104 may generate phase plane correlations for each of corresponding regions 301, 302 and/or each of corresponding regions 401, 402. In other examples, phase plane correlation module 104 may generate phase plane correlations for only some of corresponding regions 301, 302 and/or some of corresponding regions 401, 402. For example, only some of the corresponding regions may need to be evaluated to determine motion estimation correlation as discussed herein. The number and locations of such regions may be predetermined or heuristically determined or the like. In various examples, phase plane correlations 105 and subsequent motion correlation detection (discussed further below) may be generated in serial or in parallel. In some examples, if a motion correlation detection indicates weak correlation or no correlation, processing may cease on the current frames or regions such that processing time and/or power usage may be optimized.

Phase plane correlations 105 may be generated using any suitable technique or techniques. For example, generating a phase plane correlation of phase plane correlations may include an optional windowing operation, applying a discrete Fourier transform to a region (e.g., region 301a or the like) of a video frame (e.g., video frame 201) and a corresponding region (e.g., region 302a or the like) of another video frame (e.g., video frame 202), determining a cross power spectrum between the transformed region and the transformed corresponding region, applying an inverse discrete Fourier transform to the cross power spectrum, and performing a Fast Fourier Transform shift on the inverse transformed cross power spectrum to generate the phase plane correlation.

In the following, region 301a and region 302a are discussed for exemplary purposes; however, the discussed techniques may be applied to any region discussed herein. For example, an optional windowing function may be applied to region 301a of video frame 101 and the corresponding region 302a of frame 202 (or downscaled regions of regions 301a, 301b as described). The windowing function may include, for example, a Hamming or Kaiser windowing function and may reduce edge effects in the regions. In some examples, no windowing function may be applied.

A discrete Fourier transform may then be applied to region 301a of video frame 201 and the region 302a of video frame 202. The discrete Fourier transform may be implemented using a radix-2 Fast Fourier Transform, for example. In some examples the discrete Fourier transform operation may be implemented as shown in equations (1) and (2):

$$G_a = DFT\{g_a\} \quad (1)$$

$$G_b = DFT\{g_b\} \quad (2)$$

where ga may be region 301a of video frame 201 (or a downscaled and/or windowed region, as discussed), gb may be the corresponding region 302a of video frame 202 (or a downscaled and/or windowed region), DFT may represent a discrete Fourier transform, Ga may be a transformed region 301a of video frame 201, and Ga may be a transformed corresponding region 302a of video frame 202.

A cross power spectrum between the transformed region 301a of video frame 201 and corresponding region 302a of video frame 202 may be determined. The cross power spectrum may be determined by multiplying element-wise spectrum of transformed region 301a of video frame 201 and the complex conjugate of the transformed corresponding region 302a of video frame 202, and normalizing the product. An example cross power spectrum determination is shown in equation (3):

$$R = G_a G_b^* / |G_a G_b^*| \quad (3)$$

where R may be the cross power spectrum and $G_b^*$ may be the complex conjugate of the transformed corresponding region 302a of video frame 202.

An inverse discrete Fourier transform may be applied to the cross power spectrum and an optional Fast Fourier Transform shift on the inverse transformed cross power spectrum may be performed to generate a correlation plane. The inverse discrete Fourier transform may be applied as shown in equation (4):

$$r = DFT^{-1}(R) \quad (4)$$

where r may be the inverse transformed cross power spectrum and $DFT^{-1}$ may be an inverse discrete Fourier transform. The optional Fast Fourier Transform shift may include switching elements in first and third and second and fourth quarters of the inverse transformed cross power spectrum. An example Fast Fourier Transform shift is shown in equation (5):

$$c = \textit{fftshift}(r) \quad (5)$$

where c may be a correlation plane and fftshift may be a Fast Fourier Transform shift operation.

In general, the described phase plane correlation (i.e., applying an optional windowing function to two corresponding regions, applying a discrete Fourier transform to the regions, determining a cross power spectrum between regions, applying an inverse discrete Fourier transform to the cross power spectrum, optionally performing a Fast Fourier Transform shift on the inverse transformed cross power spectrum to generate a correlation plane, and/or determining a correlation of peaks in the correlation plane to determine a candidate motion vector) may be performed for any two corresponding regions as discussed herein.

Returning to FIG. 1, phase plane correlations 105 may be transferred from phase plane correlation module 104 to motion estimation correlation detection module 106. Motion estimation correlation detection module 106 may determine whether video frames 201, 202 (or the like) are motion estimation correlated based on phase plane correlations 105. In an embodiment, motion estimation correlation detection module determines whether video frames 201, 202 are motion estimation correlated based on an evaluation of one or more peaks in each phase plane correlation of phase plane correlations 105. For example, video frames 201, 202 may be motion estimation correlated if a video frame between video frames 201, 202, one of video frames 201, 202, or another video frame may be successfully predicted using motion estimation and motion compensation techniques applied to one of or both of video frames 201, 202. For example, video frames may be motion estimation correlated if relatively smooth and moderate scene motion may be successfully predicted using motion estimation and motion compensation. Furthermore, video frames 201, 202 may not be motion estimation correlated if a video frame between video frames 201, 202, one of video frames 201, 202, or another video frame may not be successfully predicted using motion estimation and motion compensation techniques applied to one of or both of video frames 201, 202. For example, scene changes, no motion, fast motion, difficult scenes, or the like may not be successfully predicted using motion estimation and compensation techniques. In such examples, it may be advantageous to generate or predict a video frame between video frames 201, 202, one of video frames 201, 202, or another video frame from vide frames 201, 202 based on a repeated use of video frame 201 or video frame 202 or a blending of video frame 201 and video 202 or the like (as used herein, such techniques indicate a "fallback" technique such as a fallback from using motion estimation and compensation).

For example, if video frame 201 represents a last frame in a previous scene and video frame 202 represents a first frame in new scene (e.g., in a scene change), creation of motion compensated frame(s) between video frame 201 and video frame 202 may produce unpleasant artifacts in the interpolated frame or the predicted frame (e.g., the generated frame).

In such instances, it may be advantageous to use video frame 201 or video frame 202 as the interpolated or predicted video frame. In some examples, detecting a scene change may include regions generation module 102 generating global regions (e.g., regions 301, 302), phase plane correlations module 104 generating global phase plane correlations, and motion estimation correlation module 106 evaluating the global phase plane correlations to determine a strong or weak correlation between video frames 201, 202. For example, video frames 201, 202 may be determined to be not motion estimation correlated due to scene change when each global phase plane correlation (e.g., global phase plane correlations based on pairs of regions 301, 302) indicates a weak correlation.

Such a strong or weak correlation may be determined based on evaluating one or more peaks in the generated phase plane correlations (e.g., the global phase plane correlations). For example, a determination between a strong and weak correlation for a phase plane correlation (for a pair of regions such us region 301a and 302a) may be determined based on two evaluations. First, a comparison may be made between a difference between a maximal peak of the phase plane correlation and an average value of the phase correlation and a threshold. Second, a comparison may be made between a difference between the maximal peak of the phase plane correlation and a second largest peak of the phase plane correlation and a threshold. For example, if either value is less than the respective threshold, a weak correlation for the phase plane correlation (and associated regions; e.g., regions 301a and 302a) may be provided, else a strong correlation for the phase plane correlation may be provided, as shown in pseudocode (6). As discussed, if all of the global phase plane correlations are weak, a scene change may be determined In such an example, motion estimation correlation module 106 may provide an indicator to frame prediction mode module indicating no motion estimation correlation and/or a scene change associated with video frames 201, 202.

For Phase Plane Correlation n:

$$\text{If } (Peak1_n - AV_n < TH1) \text{ or } (Peak1_n - Peak2_n < TH2) \text{ is TRUE,} \quad (6)$$

then weak correlation;
else strong correlation.

where n may be a counter for the current phase plane correlation, $Peak1_n$ may be a maximal peak for phase plane correlation n, $AV_n$ may be an average value for phase plane correlation n, TH1 may be a first threshold, $Peak2_n$ may be a second largest peak for phase plane correlation n, and TH2 may be a second threshold. TH1 and TH2 may be any suitable thresholds that indicate strong or weak correlations between video frame regions. In some examples, TH1 may be in the range of about 6 to 10, with 8 being particularly advantageous. In some examples, TH2 may be in the range of about 2 to 4, with 3 being particularly advantageous.

In another example, if motion in video sequence 101 is not present or is very small (e.g., in a no motion video portion), it may not be advantageous to allocate system processing to generating motion compensated video frames. Furthermore, such generated motion compensated video frames may provide judder or the like. In such examples, it may be advantageous to use video frame 201, video frame 202, or a blended frame based on video frames 201, 202 as the interpolated or predicted frame. In some examples, detecting no motion may include regions generation module 102 generating global and local regions (e.g., regions 301, 302 and regions 401, 402), phase plane correlations module 104 generating global phase plane correlations and local phase plane correlations, and motion estimation correlation module 106 evaluating the global phase plane correlations and the local phase plane correlations to determine no motion (or little motion). For example, video frames 201, 202 may be determined to be not motion estimation correlated due to no motion (or little motion) based on a comparison of the motion vector for the maximal peak of each global phase plane correlation and each local phase plane correlation to a threshold. For example, if the motion vector is less than the threshold, no motion may be indicated. The threshold may be any suitable threshold that indicates little or no motion such as a threshold in the range of 0.5 to 2 or the like. In some examples, the motion vectors may include integer values and a motion vector value of zero may correspond to no motion (e.g., such that the effective threshold is 1). As discussed, if all of the global and local phase plane correlations indicate motion vectors for maximal peaks less than a threshold, no motion may be determined for video frames 201, 202. In such an example, motion estimation correlation module 106 may provide an indicator to frame prediction mode module indicating no motion estimation correlation and/or no motion associated with video frames 201, 202.

In yet another example, in video sequence 101, fast motion may preclude motion estimation and compensation due to hardware limitations (e.g., allocated memory) or the like. For example, systems may not be capable of compensating for motion that is too large. In such examples, it may be advantageous to use video frame 201, video frame 202, or a blended frame based on video frames 201, 202 as the interpolated or predicted frame. In some examples, detecting fast motion may include regions generation module 102 generating global regions (e.g., regions 301, 302), phase plane correlations module 104 generating global phase plane correlations, and motion estimation correlation module 106 evaluating the global phase plane correlations to determine whether video frames 201, 202 are motion estimation correlated based on fast motion.

For example, video frames 201, 202 may be determined to be not motion estimation correlated due to fast motion when any (e.g., one or more) of the global phase plane correlations indicate fast motion. A fast motion may be indicated based on a comparison of a motion vector associated with a maximal peak of the phase plane correlation and a threshold. For example, if a magnitude of the motion vector or a magnitude of the motion vector in a horizontal and/or vertical direction is greater than a threshold, fast motion may be determined The threshold may be any suitable threshold that indicates fast motion and/or indicates a limitation of system hardware. In some examples, a vertical direction threshold may be in the range of about 12 to 20 pixels, with 16 pixels being particularly advantageous. In some examples, a horizontal direction threshold may be in the range of about 48 to 76 pixels, with 64 pixels being particularly advantageous. As discussed, if any of the global phase plane correlations indicate fast motion, fast motion may be determined for video frames 201, 202. In such an example, motion estimation correlation module 106 may provide an indicator to frame prediction mode module indicating no motion estimation correlation and/or fast motion associated with video frames 201, 202.

In an additional example, if video sequence 101 indicates a difficult scene (e.g., scenes of action movies or sporting events), generating interpolated or predicted frames may be prohibitively complicated and/or may cause artifacts. In such examples, it may be advantageous to use video frame 201, video frame 202, or a blended frame based on video frames 201, 202 as the interpolated or predicted frame. In some examples, detecting a difficult scene may include regions generation module 102 generating local regions (e.g., regions 401, 402), phase plane correlations module 104 generating local phase plane correlations, and motion estimation correlation module 106 evaluating the local phase plane correlations to determine whether video frames 201, 202 are motion estimation correlated based on fast motion. For example, determining whether video frame 201 and video frame 202 are motion estimation correlated may be based on a comparison of a number of the local phase plane correlations that indicate a weak correlation to a threshold.

For example, a determination between a strong and weak correlation for a phase plane correlation (for a pair of regions such us any corresponding regions of regions 401 and 402) may be determined based on two evaluations as discussed above with respect to pseudo-code (6). First, a comparison may be made between a difference between a maximal peak of the phase plane correlation and an average value of the phase correlation and a threshold. Second, a comparison may be made between a difference between the maximal peak of the phase plane correlation and a second largest peak of the phase plane correlation and a threshold. For example, if either value is less than the respective threshold, a weak correlation for the phase plane correlation (and associated regions) may be provided, else a strong correlation for the phase plane correlation may be provided. As discussed, if the number of weak correlation local phase plane correlations exceed a threshold, difficult scene may be determined for video frames 201, 202. The threshold number of weak local phase plane correlations may be any suitable value that indicates a difficult scene. For example, the threshold may be in the range of about 12 to 24, with 18 being particularly advantageous. In such an example, motion estimation correlation module 106 may provide an indicator to frame prediction mode module indicating no motion estimation correlation and/or a difficult scene associated with video frames 201, 202.

Furthermore, the number of weak local phase plane correlations threshold may be adaptive. For example, the threshold may be adaptive based on whether video frames (such as video frames 201, 202) are motion estimated correlated due to difficult scene (or, in another example, whether they are motion estimated correlated due to any reason as discussed herein). For example, assuming an initial threshold value is set and a mode is set to fallback (e.g., where repeated or blended frames are used for interpolation or prediction in place of motion compensated frames), then, if the number of local weak correlations is less than the initial threshold, the mode may be changed from fallback to motion estimation and the threshold may be increased to a second threshold (e.g., by about 25% or the like). Subsequently, if the number of local weak correlations is greater than the second threshold, the mode may be set to fallback and the second threshold may be decreased to a third threshold (e.g., by about 25% or the like). Using such techniques, switching modes may be less frequent and/or more robust, which may provide more desirable video for a user with less artifacts and the like. Other techniques for more robust switching between modes are discussed herein with respect to FIG. 5.

Returning to FIG. 1, as discussed, motion estimation correlation detection module 106 may provide indicator(s) indicating whether video frames are motion estimation correlated and/or a type for video frames that are not motion estimation correlated (e.g., scene change, no motion, fast motion, or difficult scene, or the like). As shown, frame prediction mode module 108 may receive such indicators and provide a frame prediction mode 109 (e.g., a video frame prediction mode). Frame prediction mode 109 may include any indicator or signal or the like indicating a frame prediction mode such as a frame prediction mode indicator or the like. The indicator may include any suitable information or signal. For example, if frames are motion estimation correlated, frame prediction mode module 108 may provide a motion estimation mode indicator. If frames are not motion estimation correlated, frame prediction mode module 108 may provide a fallback mode indicator. In other embodiments, frame prediction mode module 108 may implement a state machine or the like such that whether video frames are motion estimation correlated and/or the type for video frames that are not motion estimation correlated and a past state of system 100 may be used to determine frame prediction mode 105, as is discussed further herein with respect to FIG. 5.

As shown, frame prediction mode module 110 may receive frame prediction mode 109 and video sequence 101. Frame prediction mode module 110 may determine whether frame prediction mode 109 indicates motion estimation (ME) 111 or fallback (FB) 113 (e.g., a motion estimation mode or a fallback mode). If frame prediction mode 109 indicates motion estimation 111, frame prediction module 110 may, via motion estimation/compensation module 112, determine a motion estimation and compensation based frame (MEF) 115. Motion estimation and compensation based frame 115 may be determined using any suitable motion estimation and compensation based techniques such as determining motion vectors associated with motion between video frames 201, 202 and frame prediction based on a reference frame and the motion vectors or the like. In some examples phase plane correlations 105 may be used to determine the motion vectors or predicted motion vectors or the like. In an embodiment, MEF 115 is a predicted frame based on one of video frame 201 or video frame 202.

If frame prediction mode 109 indicates fallback (FB) 113 (e.g., a fallback to prediction using a video frame repeat or blending), frame prediction module 110 may, via frame repeat or frame blending module 114, determine a fallback based frame (FBF) 115. Fallback based frame 115 may be determined using any suitable techniques such as using video frame 201 or 202 as the interpolated or predicted frame or blending video frame 201 and video frame 202 (e.g., averaging pixel values between video frames 201, 202 or the like). In an embodiment, FBF is a predicted frame based on one of repeating video frame 201, repeating video frame 202, or blending video frame 201 and video frame 202. Determining whether to use a repeated frame (and/or which repeated frame) or to blend frames may be based on analyzing the frames or the determination may be present. In an embodiment, a default fallback mode is a blending mode.

As shown in FIG. 1, frame prediction module 110 may provide the relevant interpolated or predicted frame (e.g., based on which of MEF 115 or FBF 117 was generated) as a predicted video frame 119 for storage in memory, presentment to a user, further processing, or the like. For example, predicted video frame 119 may be inserted in video sequence 101 for frame rate up-conversion. In another example, predicted video frame 119 and/or data associated with predicted video frame (e.g., motion vectors, motion vector fields, differential motion vectors, or the like) may be processed and encoded for video compression.

Figure 5:
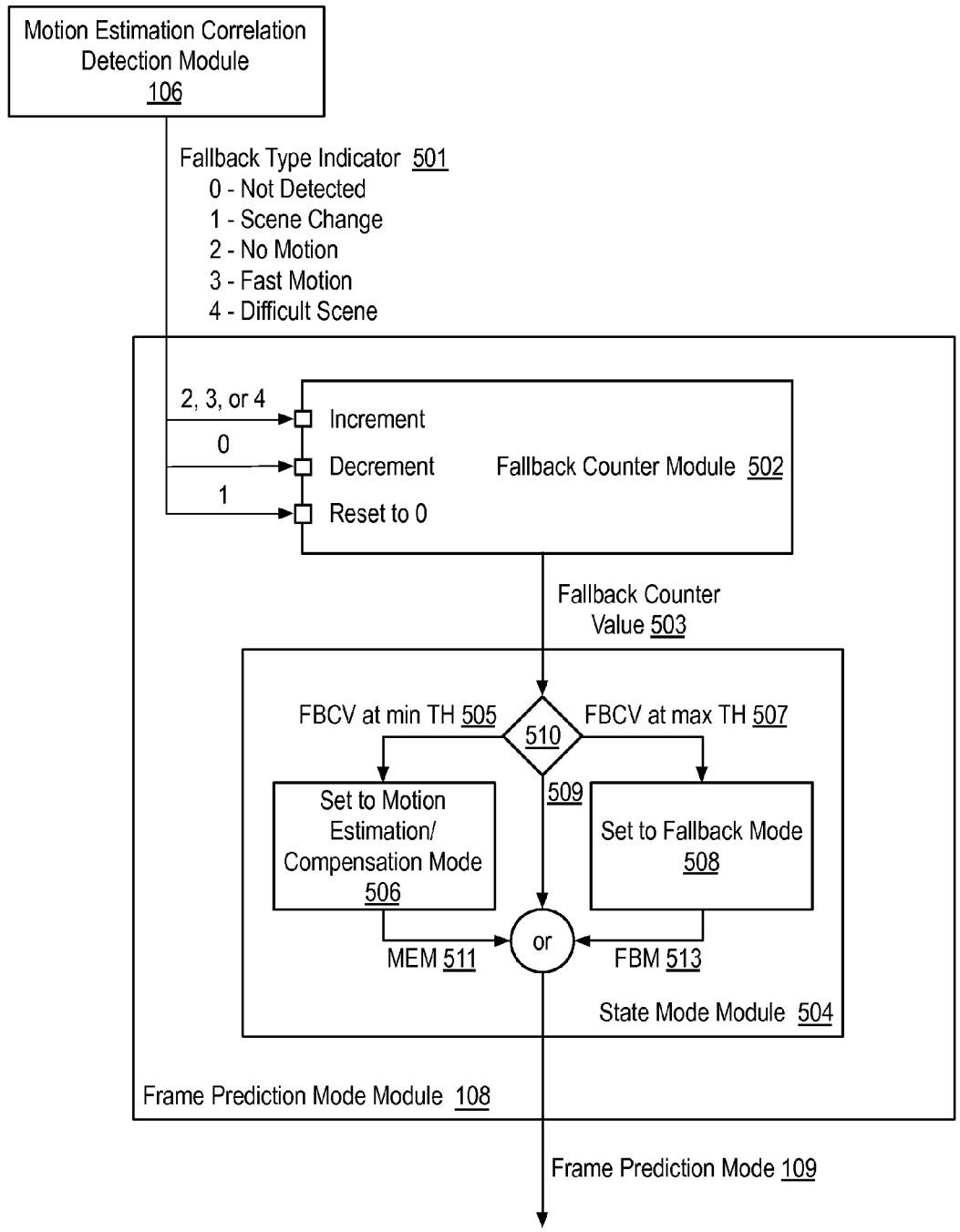
FIG. 5 illustrates an example frame prediction mode module.

FIG. 5 illustrates an example frame prediction mode module 108, arranged in accordance with at least some implementations of the present disclosure. As shown in FIG. 5, frame prediction mode module 108 may include a fallback counter module 502 and a state mode module 504. As discussed, motion estimation correlation detection module 106 may provide an indicator as to whether video frames are motion estimation correlated and, if the video frames are not motion estimation, a type. In the illustrated example, motion estimation correlation detection module 106 may provide a fallback type indicator 501 including values ranging from 0-4; however, any suitable indicators may be used. As shown, a fallback type indicator 501 value of 0 may indicate video frames (e.g., video frames 201, 202) are motion estimation correlated (e.g., fallback not detected or no fallback) and a value of 1, 2, 3, or 4 may indicate video frames are not motion estimation correlated. Furthermore, each of values 1-4 may indicate a type when video frames are not motion estimation correlated. For example, a value of 1 may indicate a scene change, a value of 2 may indicate no motion, a value of 3 may indicate fast motion, and a value of 4 may indicate a difficult scene, as shown.

Frame prediction mode module 108 may determine frame prediction mode 109 based in part on fallback type indicator 501. For example, frame prediction mode module 108 may receive fallback type indicator 501 via fallback counter module 502. Fallback counter module 502 may store and manipulate a fallback counter (or fallback counter value). For example, counter module 502 may determine a current fallback counter value based on a previous fallback counter value and fallback type indicator 501. As shown, in some examples, based on fallback type indicator 501, fallback counter module 502 may increment, decrement, or reset to 0 the fallback counter. For example, fallback type indicator 501 is 1(e.g., indicating a scene change), the fallback counter may be reset to 0. If fallback type indicator 501 is 2, 3, or 4, (e.g., indicating no motion, fast motion, or difficult scene, respectively), the fallback counter may be incremented by a value such as, for example, 1. In the illustrated example, the fallback counter is incremented by the same amount for each type. In other examples, the fallback counter may be incremented by different values for different types. Furthermore, if the fallback type indicator is 0(e.g., indicating the video frames are motion estimation correlated) the fallback counter may be decremented by a value such as, for example, 1.

As shown, fallback counter module may determine the current fallback counter and may provide it as a fallback counter value 503 to state mode module 504. As shown, state mode module 504 may make a determination at decision module 510 as to a status of the fallback counter value. For example, if the fallback counter value (FBCV) is at a minimum threshold 505 (e.g., equals a predetermined minimum threshold), state mode module 504 may set a frame prediction mode, via set to motion estimation/compensation mode module 506, to a motion estimation mode (MEM) 511. If the fallback counter value (FBCV) is at a maximum threshold 507 (e.g., equals a predetermined maximum threshold), state mode module 504 may set a frame prediction mode, via set to fallback mode module 506, to a fallback mode (FBM) 513 (e.g., where a repeated video frame or video frame blending may be used). If the fallback counter value is between the minimum and maximum thresholds, no change (as indicated via a no change indicator 509) may be made to the mode (e.g., the mode is left unchanged as either motion estimation mode or fallback mode). As shown, based on whether no change 509, MEM 511, or FBM 513 is determined, state mode module 504 may provide a corresponding frame prediction mode 109 (e.g., changed to motion estimation mode, changed to fallback mode, or no change from the previously provide mode), as discussed with respect to FIG. 1 and elsewhere herein.

The discussed minimum and maximum thresholds may be any suitable values that provide for a robust decision or change strategy for frame prediction mode module 108. In an example, the minimum threshold may be 0 and the maximum threshold may be 5. As shown, scene change (e.g., fallback type indicator 501 value of 1) may present a special result that may reset the fallback counter value to the minimum threshold and set, via state mode module 504, frame prediction mode 109 to motion estimation mode 511. For example, fallback counter module 502 and state mode module 504 may provide for less abrupt changes between motion estimation mode 511 and fallback mode 513, which may provide for a mote robust change strategy such that resulting video may include fewer artifacts and the like.

The above discussed operations may be performed together or separately to manage motion estimation in video processing via providing fallback to use of a repeated or blended video frame in certain circumstances.

Figure 6:
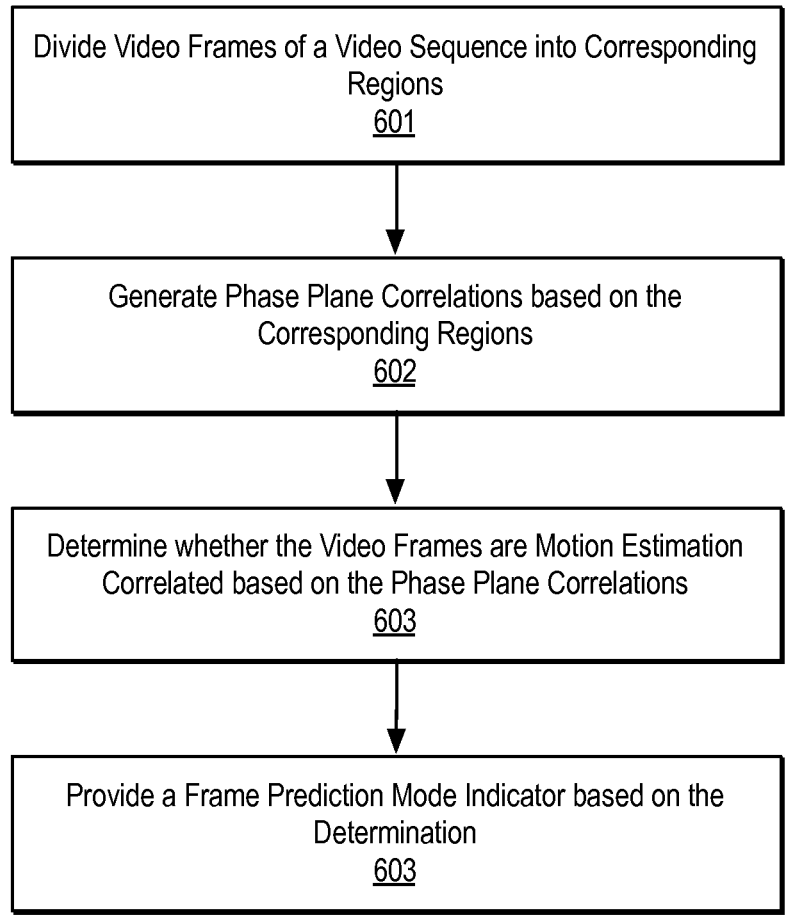
FIG. 6 is a flow diagram illustrating an example process for managing motion estimation in video processing.

FIG. 6 is a flow diagram illustrating an example process 600 for managing motion estimation in video processing, arranged in accordance with at least some implementations of the present disclosure. Process 600 may include one or more operations 601-604 as illustrated in FIG. 6. Process 600 may form at least part of a process for generating predicted video frames. By way of non-limiting example, process 600 may form at least part of process for generating predicted video frames for one or more video sequences as undertaken by system 100 as discussed herein. Further, process 600 will be described herein in reference to system 700 of FIG. 7.

Figure 7:
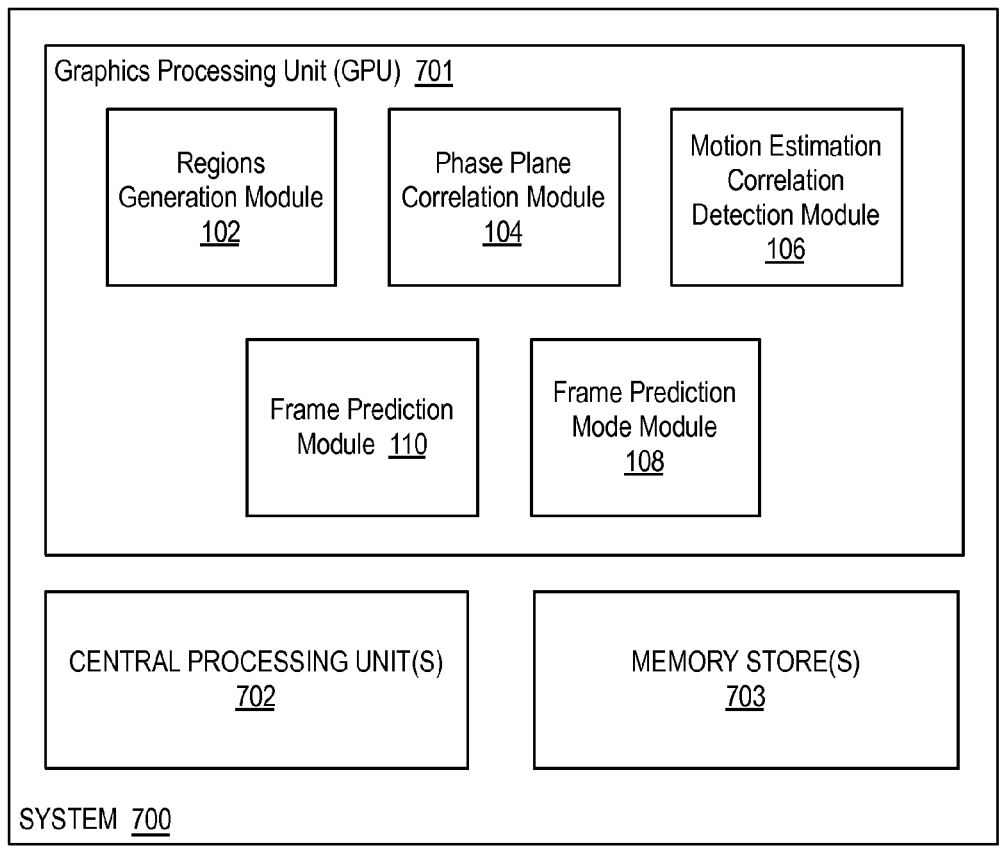
FIG. 7 is an illustrative diagram of an example system.

FIG. 7 is an illustrative diagram of an example system 700, arranged in accordance with at least some implementations of the present disclosure. As shown in FIG. 7, system 700 may include a graphics processing unit (GPU) 701, one or more central processing units 702, and memory stores 703. Also as shown, GPU 701 may include regions generation module 102, phase plane correlation module 104, motion estimation correlation detection module 106, frame prediction mode module 108, and frame prediction module 110. In the example of system 700, memory stores 703 may store image content such as video sequence 101 and/or predicted video frame 119 or the like. Although not shown in FIG. 7, in some examples, system 700 may include a display device for the presentment of video sequences to a user.

Figure 8:
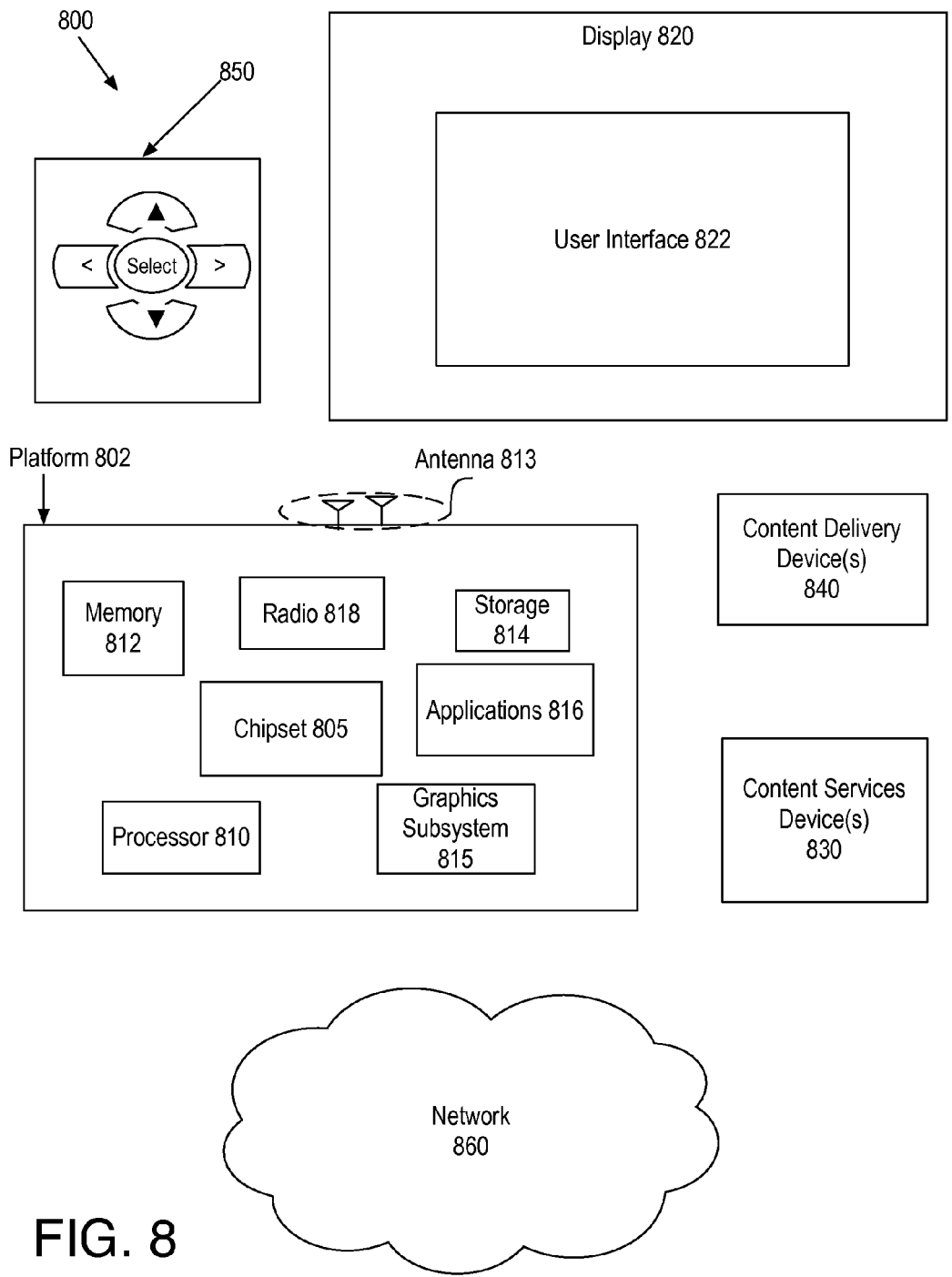
FIG. 8 is an illustrative diagram of an example system.
Figure 9:
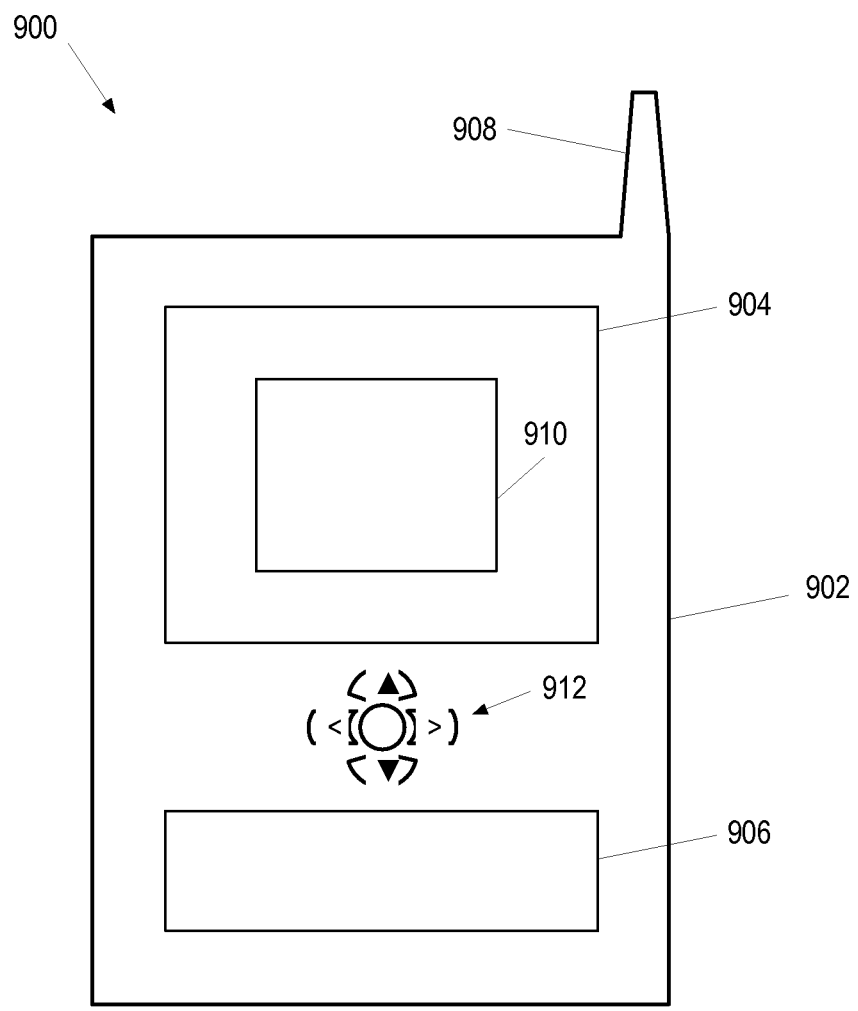
FIG. 9 illustrates an example device, all arranged in accordance with at least some implementations of the present disclosure.

System 700 may include any suitable system as discussed with respect to FIGS. 8 and 9 and elsewhere herein such as, for example, a computer, a smart TV, a mobile device such as a smartphone or tablet, or the like. As shown, in some examples, regions generation module 102, phase plane correlation module 104, motion estimation correlation detection module 106, frame prediction mode module 108, and frame prediction module 110 may be implemented via GPU 701. In other examples, one, some or all of regions generation module 102, phase plane correlation module 104, motion estimation correlation detection module 106, frame prediction mode module 108, and frame prediction module 110 may be implemented via central processing units 702.

Graphics processing unit 701 may include any number and type of graphics processing units that may provide the operations as discussed herein. Such operations may be implemented via software or hardware or a combination thereof. For example, graphics processing unit 701 may include circuitry dedicated to manipulate video sequences from memory as discussed herein. Central processing units 702 may include any number and type of processing units or modules that may provide control and other high level functions for system 700 and/or any of the operations as discussed herein. Memory stores 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 703 may be implemented by cache memory.

In an embodiment, one, some or all of regions generation module 102, phase plane correlation module 104, motion estimation correlation detection module 106, frame prediction mode module 108, and frame prediction module 110 may be implemented may be implemented via an execution unit (EU) of graphics processing unit 701. The EU may include, for example, programmable logic or circuitry such as a logic core or cores that may provide a wide array of programmable logic functions. In an embodiment, one, some or all of regions generation module 102, phase plane correlation module 104, motion estimation correlation detection module 106, frame prediction mode module 108, and frame prediction module 110 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 600 may begin at operation 601, "Divide Video Frames of a Video Sequence into Corresponding Regions", where video frames of a video sequence may be divided into corresponding regions. For example, video frames 201, 202 of video sequence 101 may be divided into regions 301, 302 and/or regions 401, 402 as discussed herein via regions generation module 102 as implemented by GPU 701. In an embodiment, the regions are global regions. In another embodiment, the regions are local regions.

Processing may continue at operation 602, "Generate Phase Plane Correlations based on the Corresponding Regions", where phase plane correlations may be generated based on the corresponding pairs of regions. For example, phase plane correlations 105 may be generated as discussed herein via phase plane correlation module 104 as implemented by GPU 701. In an embodiment, the phase plane correlations are global phase plane correlations. In another embodiment, the phase plane correlations are local phase plane correlations. In yet another embodiment, both local and global phase plane correlations are generated.

Processing may continue at operation 603, "Determine whether the Video Frames are Motion Estimation Correlated based on the Phase Plane Correlations", where a determination may be made as to whether the video frames are motion estimation correlated based on the phase plane correlation. For example, motion estimation correlation detection module 106 as implemented by GPU 701 may determine whether video frames 201, 202 are motion estimation correlated as discussed herein. In an embodiment, if the video frames are not motion estimation correlated, motion estimation correlation detection module 106 may also determine a type for the video frames not being motion estimation correlated (e.g., scene change, no motion, fast motion, or difficult scene, or the like).

Processing may continue at operation 604, "Provide a Frame Prediction Mode Indicator based on the Determination", where a frame prediction mode indicator may be provided based on the determination. For example, frame prediction mode module 108 as implemented by GPU 701 may provide frame prediction mode 109 as discussed herein. In an embodiment, the frame prediction mode indicator indicates a motion estimation mode. In another embodiment, the frame prediction mode indicator indicates a fallback mode. The frame prediction mode indicator may be determined based on the received motion estimation correlation detection and/or a previous state of a fallback counter or the like.

As discussed, based on the frame prediction mode indicator, interpolated or predicted video frames may be generated. For example, if the frame prediction mode indicator indicates a motion estimation mode, motion estimation and/or motion compensation techniques may be used to generate an interpolated or predicted video frame such as predicted video frame 119 and, if the frame prediction mode indicator indicates a fallback mode, a repeated frame or a blended frame may be used to generate an interpolated or predicted video frame such as predicted video frame 119. Process 900 may be repeated any number of times either in series or in parallel for any number of video sequences.

Various components of the systems described herein may be implemented in software, firmware, and/or hardware and/or any combination thereof. For example, various components of system 100 or system 700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes (e.g., process 600 or those discussed with respect to FIGS. 1-5) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

FIG. 8 is an illustrative diagram of an example system 800, arranged in accordance with at least some implementations of the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

As described above, system 800 may be embodied in varying physical styles or form factors. FIG. 9 illustrates implementations of a small form factor device 900 in which system 900 may be embodied. In various embodiments, for example, device 900 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for managing motion estimation in video processing comprises dividing a first video frame of a video sequence into first regions and a second video frame of the video sequence into second regions corresponding to the first regions, generating a plurality of phase plane correlations, wherein each phase plane correlation of the plurality of phase plane correlations is based on a corresponding pair of first and second regions, determining whether the first video frame and the second video frame are motion estimation correlated based at least in part on the plurality of phase plane correlations, and providing a video frame prediction mode indicator based at least in part on the determination.

Further to the first embodiments, determining whether the first video frame and the second video frame are motion estimation correlated comprises evaluating one or more peaks in the plurality of phase plane correlations.

Further to the first embodiments, the method further comprises, prior to generating the plurality of phase plane correlations, downscaling the first regions and the second regions.

Further to the first embodiments, the method further comprises downscaling, prior to generating the plurality of phase plane correlations, the first regions and the second regions and/or dividing the first video frame into third regions and the second video frame into fourth regions corresponding to the third regions, wherein the first regions and the second regions comprise global regions and wherein the plurality of phase plane correlations comprise global phase plane correlations and wherein there are fewer first regions than third regions, and generating a plurality of local phase plane correlations, wherein each local phase plane correlation of the plurality of local phase plane correlations is based on a corresponding pair of third and fourth regions, and wherein determining whether the first video frame and the second video frame are motion estimation compatible is based at least in part on the plurality of local phase plane correlations.

Further to the first embodiments, the method further comprises downscaling, prior to generating the plurality of phase plane correlations, the first regions and the second regions and/or dividing the first video frame into third regions and the second video frame into fourth regions corresponding to the third regions, wherein the first regions and the second regions comprise global regions and wherein the plurality of phase plane correlations comprise global phase plane correlations and wherein there are fewer first regions than third regions, and generating a plurality of local phase plane correlations, wherein each local phase plane correlation of the plurality of local phase plane correlations is based on a corresponding pair of third and fourth regions, and wherein determining whether the first video frame and the second video frame are motion estimation compatible is based at least in part on the plurality of local phase plane correlations, wherein the first video frame and the second video frame are determined to be not motion estimation correlated based on a comparison of each motion vector associated with each maximal peak of each of the plurality of global phase plane correlations and the plurality of local phase plane correlations to a threshold.

Further to the first embodiments, determining whether the first video frame and the second video frame are motion estimation correlated comprises determining whether one or more of the phase plane correlations indicates a strong correlation or a weak correlation based on at least one of a comparison of a difference between a maximal peak of the first phase plane correlation and an average value of the first phase plane correlation and a first threshold or a comparison of a difference between the maximal peak of the first phase plane correlation and a second largest peak of the first phase plane correlation and a second threshold.

Further to the first embodiments, the first regions and the second regions comprise global regions, wherein the first video frame and the second video frame are determined to be not motion estimation correlated when each of the plurality of phase plane correlations indicates a weak correlation, and wherein a first weak correlation for a first phase plane correlation of the plurality of phase plane correlations is determined based on at least one of a comparison of a difference between a maximal peak of the first phase plane correlation and an average value of the first phase plane correlation and a first threshold or a comparison of a difference between the maximal peak of the first phase plane correlation and a second largest peak of the first phase plane correlation and a second threshold.

Further to the first embodiments, the first regions and the second regions comprise global regions, wherein the first video frame and the second video frame are determined to be not motion estimation correlated when any of the plurality of phase plane correlations indicates a fast motion, and wherein a first fast motion for a first phase plane correlation of the plurality of phase plane correlations is determined based on comparison of a motion vector associated with a maximal peak of the first phase plane correlation and a threshold.

Further to the first embodiments, the first regions and the second regions comprise local regions, and wherein determining whether the first video frame and the second video frame are motion estimation correlated is based on a comparison of a number of the plurality of local phase plane correlations that indicate a weak correlation to a threshold.

Further to the first embodiments, the first regions and the second regions comprise local regions, and wherein determining whether the first video frame and the second video frame are motion estimation correlated is based on a comparison of a number of the plurality of local phase plane correlations that indicate a weak correlation to a threshold, and wherein the threshold is adaptive based at least in part on whether the first video frame and the second video frame are motion estimation correlated.

Further to the first embodiments, the first regions and the second regions comprise local regions, and wherein determining whether the first video frame and the second video frame are motion estimation correlated is based on a comparison of a number of the plurality of local phase plane correlations that indicate a weak correlation to a threshold, wherein the threshold is adaptive based at least in part on whether the first video frame and the second video frame are motion estimation correlated, and wherein the frame prediction mode indicator comprises a fallback mode and the threshold is at a first value, wherein the total number of the plurality of global phase plane correlations and the plurality of local phase plane correlations that indicate a weak correlation is less than the threshold, and the method further comprises setting the frame prediction mode indicator to a motion estimation mode and increasing the threshold from the first value to a second value greater than the first value.

Further to the first embodiments, the first regions and the second regions comprise local regions and wherein determining whether the first video frame and the second video frame are motion estimation correlated is based on a comparison of a number of the plurality of local phase plane correlations that indicate a weak correlation to a threshold and/or wherein the threshold is adaptive based at least in part on whether the first video frame and the second video frame are motion estimation correlated.

Further to the first embodiments, the first regions and the second regions comprise global regions and wherein the plurality of phase plane correlations comprise global phase plane correlations, and the method further comprises dividing the first video frame into third regions and the second video frame into fourth regions corresponding to the third regions, wherein there are fewer first regions than third regions and generating a plurality of local phase plane correlations, wherein each local phase plane correlation of the plurality of local phase plane correlations is based on a corresponding pair of third and fourth regions, wherein determining whether the first video frame and the second video frame are motion estimation compatible is based at least in part on the plurality of local phase plane correlations.

Further to the first embodiments, the first regions and the second regions comprise global regions and wherein the plurality of phase plane correlations comprise global phase plane correlations, and the method further comprises dividing the first video frame into third regions and the second video frame into fourth regions corresponding to the third regions, wherein there are fewer first regions than third regions and generating a plurality of local phase plane correlations, wherein each local phase plane correlation of the plurality of local phase plane correlations is based on a corresponding pair of third and fourth regions, wherein determining whether the first video frame and the second video frame are motion estimation compatible is based at least in part on the plurality of local phase plane correlations, and wherein the first video frame and the second video frame are determined to be not motion estimation correlated based on a comparison of each motion vector associated with each maximal peak of each of the plurality of global phase plane correlations and the plurality of local phase plane correlations to a threshold.

Further to the first embodiments, the method further comprises determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator.

Further to the first embodiments, determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator, determining a current fallback counter value based at least in part on the fallback type indicator and a previous fallback counter value, wherein if the fallback type indicator is the scene change indicator, the current fallback counter value is reset to zero, if the fallback type indicator is the no fallback indicator, the current fallback counter value is decremented with respect to the previous fallback counter value, and if the fallback type indicator is any one of the no motion indicator, the fast motion indicator, or the difficult scene indicator, the current fallback counter value is incremented with respect to the previous fallback counter value, and determining the frame prediction mode indicator based on the current fallback counter value, wherein if the fallback counter is at a first threshold, the frame prediction mode indicator is set to a fallback mode, if the fallback counter is at a second threshold that is less than the first threshold, the frame prediction mode indicator is set to a motion estimation mode, and if the fallback counter is between the first and second thresholds, the frame prediction mode indicator is unchanged.

Further to the first embodiments, the method further comprises determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator and/or determining a current fallback counter value based at least in part on the fallback type indicator and a previous fallback counter value, wherein if the fallback type indicator is the scene change indicator, the current fallback counter value is reset to zero, if the fallback type indicator is the no fallback indicator, the current fallback counter value is decremented with respect to the previous fallback counter value, and if the fallback type indicator is any one of the no motion indicator, the fast motion indicator, or the difficult scene indicator, the current fallback counter value is incremented with respect to the previous fallback counter value, and determining the frame prediction mode indicator based on the current fallback counter value, wherein if the fallback counter is at a first threshold, the frame prediction mode indicator is set to a fallback mode, if the fallback counter is at a second threshold that is less than the first threshold, the frame prediction mode indicator is set to a motion estimation mode, and if the fallback counter is between the first and second thresholds, the frame prediction mode indicator is unchanged.

Further to the first embodiments, determining an individual phase plane correlation of the plurality of phase plane correlations comprises applying a discrete Fourier transform to an individual first region and a corresponding second region, determining a cross power spectrum between the transformed individual first region and the transformed corresponding second region, applying an inverse discrete Fourier transform to the cross power spectrum, and performing a Fast Fourier Transform shift on the inverse transformed cross power spectrum to generate the individual phase plane correlation.

Further to the first embodiments, the frame prediction mode indicator comprises at least one of a motion estimation mode or a fallback mode and the method further comprises generating, if the frame prediction mode indicator comprises the motion estimation mode, a predicted frame based on at least one of the first frame or the second frame using motion estimation and generating, if the frame prediction mode indicator comprises the fallback mode, a second predicted frame based on at least one of repeating the first frame or the second frame or blending the first frame and the second frame.

In one or more second embodiments, a system for managing motion estimation on a computing device comprises a display device configured to present a video sequence and a graphics processing unit coupled to the display device, wherein the graphics processing unit comprises regions generation circuitry configured to divide a first video frame of a video sequence into first regions and a second video frame of the video sequence into second regions corresponding to the first regions, phase plane correlation circuitry configured to generate a plurality of phase plane correlations, wherein each phase plane correlation of the plurality of phase plane correlations is based on a corresponding pair of first and second regions, motion estimation correlation detection circuitry configured to determine whether the first video frame and the second video frame are motion estimation correlated based at least in part on the plurality of phase plane correlations, and frame prediction mode circuitry configured to provide a video frame prediction mode indicator based at least in part on the determination.

Further to the second embodiments, the motion estimation correlation detection circuitry being configured to determine whether the first video frame and the second video frame are motion estimation correlated comprises the motion estimation correlation detection circuitry being configured to determine whether one or more of the phase plane correlations indicates a strong correlation or a weak correlation based on at least one of a comparison of a difference between a maximal peak of the first phase plane correlation and an average value of the first phase plane correlation and a first threshold or a comparison of a difference between the maximal peak of the first phase plane correlation and a second largest peak of the first phase plane correlation and a second threshold.

Further to the second embodiments, the first regions and the second regions comprise global regions, wherein the first video frame and the second video frame are determined to be not motion estimation correlated when each of the plurality of phase plane correlations indicates a weak correlation, and wherein a first weak correlation for a first phase plane correlation of the plurality of phase plane correlations is determined based on at least one of a comparison of a difference between a maximal peak of the first phase plane correlation and an average value of the first phase plane correlation and a first threshold or a comparison of a difference between the maximal peak of the first phase plane correlation and a second largest peak of the first phase plane correlation and a second threshold.

Further to the second embodiments, the first regions and the second regions comprise global regions, wherein the first video frame and the second video frame are determined to be not motion estimation correlated when any of the plurality of phase plane correlations indicates a fast motion, and wherein a first fast motion for a first phase plane correlation of the plurality of phase plane correlations is determined based on comparison of a motion vector associated with a maximal peak of the first phase plane correlation and a threshold.

Further to the second embodiments, the first regions and the second regions comprise global regions and wherein the plurality of phase plane correlations comprise global phase plane correlations, wherein the regions generation circuitry is further configured to divide the first video frame into third regions and the second video frame into fourth regions corresponding to the third regions, wherein there are fewer first regions than third regions, wherein the phase plane correlation circuitry is further configured to generate a plurality of local phase plane correlations, wherein each local phase plane correlation of the plurality of local phase plane correlations is based on a corresponding pair of third and fourth regions, and wherein the motion estimation correlation detection circuitry is further configured to determine whether the first video frame and the second video frame are motion estimation compatible based at least in part on the plurality of local phase plane correlations.

Further to the second embodiments, the first regions and the second regions comprise global regions and wherein the plurality of phase plane correlations comprise global phase plane correlations, wherein the regions generation circuitry is further configured to divide the first video frame into third regions and the second video frame into fourth regions corresponding to the third regions, wherein there are fewer first regions than third regions, wherein the phase plane correlation circuitry is further configured to generate a plurality of local phase plane correlations, wherein each local phase plane correlation of the plurality of local phase plane correlations is based on a corresponding pair of third and fourth regions, and wherein the motion estimation correlation detection circuitry is further configured to determine whether the first video frame and the second video frame are motion estimation compatible based at least in part on the plurality of local phase plane correlations, and wherein the motion estimation correlation detection circuitry is configured to determine whether the first video frame and the second video frame are motion estimation correlated based on a comparison of each motion vector associated with each maximal peak of each of the plurality of global phase plane correlations and the plurality of local phase plane correlations to a threshold.

Further to the second embodiments, the first regions and the second regions comprise local regions, and wherein the motion estimation correlation detection circuitry is configured to determine whether the first video frame and the second video frame are motion estimation correlated based on a comparison of a number of the plurality of local phase plane correlations that indicate a weak correlation to a threshold.

Further to the second embodiments, the system further comprises a memory configured to store the input image.

In one or more third embodiments, a system for providing object detection on a computing device comprises a display device configured to present image data and a graphics processing unit coupled to the display device, wherein the graphics processing unit comprises means for dividing a first video frame of a video sequence into first regions and a second video frame of the video sequence into second regions corresponding to the first regions, means for generating a plurality of phase plane correlations, wherein each phase plane correlation of the plurality of phase plane correlations is based on a corresponding pair of first and second regions, means for determining whether the first video frame and the second video frame are motion estimation correlated based at least in part on the plurality of phase plane correlations, and means for providing a video frame prediction mode indicator based at least in part on the determination.

Further to the third embodiments, the first regions and the second regions comprise local regions, and wherein the means for determining whether the first video frame and the second video frame are motion estimation correlated determine whether the first video frame and the second video frame are motion estimation correlated based on a comparison of a number of the plurality of local phase plane correlations that indicate a weak correlation to a threshold.

Further to the third embodiments, the first regions and the second regions comprise global regions and wherein the plurality of phase plane correlations comprise global phase plane correlations, and the system further comprises means for dividing the first video frame into third regions and the second video frame into fourth regions corresponding to the third regions, wherein there are fewer first regions than third regions and means for generating a plurality of local phase plane correlations, wherein each local phase plane correlation of the plurality of local phase plane correlations is based on a corresponding pair of third and fourth regions, wherein determining whether the first video frame and the second video frame are motion estimation compatible is based at least in part on the plurality of local phase plane correlations.

In one or more fourth embodiments, at least one machine readable medium comprises a plurality of instructions that in response to being executed on a computing device, cause the computing device to manage motion estimation by dividing a first video frame of a video sequence into first regions and a second video frame of the video sequence into second regions corresponding to the first regions, generating a plurality of phase plane correlations, wherein each phase plane correlation of the plurality of phase plane correlations is based on a corresponding pair of first and second regions, determining whether the first video frame and the second video frame are motion estimation correlated based at least in part on the plurality of phase plane correlations, and providing a video frame prediction mode indicator based at least in part on the determination.

Further to the fourth embodiments, the first regions and the second regions comprise local regions, wherein determining whether the first video frame and the second video frame are motion estimation correlated is based on a comparison of a number of the plurality of local phase plane correlations that indicate a weak correlation to a threshold.

Further to the fourth embodiments, the first regions and the second regions comprise local regions, wherein determining whether the first video frame and the second video frame are motion estimation correlated is based on a comparison of a number of the plurality of local phase plane correlations that indicate a weak correlation to a threshold, and wherein the threshold is adaptive based at least in part on whether the first video frame and the second video frame are motion estimation correlated.

Further to the fourth embodiments, the machine readable medium further comprises instructions that in response to being executed on a computing device, cause the computing device to manage motion estimation by determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator.

Further to the fourth embodiments, the machine readable medium further comprises instructions that in response to being executed on a computing device, cause the computing device to manage motion estimation by determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator, determining a current fallback counter value based at least in part on the fallback type indicator and a previous fallback counter value, wherein if the fallback type indicator is the scene change indicator, the current fallback counter value is reset to zero, if the fallback type indicator is the no fallback indicator, the current fallback counter value is decremented with respect to the previous fallback counter value, and if the fallback type indicator is any one of the no motion indicator, the fast motion indicator, or the difficult scene indicator, the current fallback counter value is incremented with respect to the previous fallback counter value, and determining the frame prediction mode indicator based on the current fallback counter value, wherein if the fallback counter is at a first threshold, the frame prediction mode indicator is set to a fallback mode, if the fallback counter is at a second threshold that is less than the first threshold, the frame prediction mode indicator is set to a motion estimation mode, and if the fallback counter is between the first and second thresholds, the frame prediction mode indicator is unchanged.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for managing motion estimation in video processing comprising:
   dividing a first video frame of a video sequence into first regions and a second video frame of the video sequence into second regions corresponding to the first regions, wherein the first regions and the second regions comprise global regions;
   generating a plurality of phase plane correlations, wherein each phase plane correlation of the plurality of phase plane correlations is based on a corresponding pair of first and second regions;
   determining whether the first video frame and the second video frame are motion estimation correlated based at least in part on the plurality of phase plane correlations, wherein the first video frame and the second video frame are determined to be not motion estimation correlated when any of the plurality of phase plane correlations indicates a fast motion, and wherein a first fast motion for a first phase plane correlation of the plurality of phase plane correlations is determined based on a comparison of a motion vector associated with a maximal peak of the first phase plane correlation and a threshold; and
   providing a video frame prediction mode indicator based at least in part on the determination.

2. The method of claim 1, further comprising, prior to generating the plurality of phase plane correlations:
   downscaling the first regions and the second regions.

3. The method of claim 1, wherein determining whether the first video frame and the second video frame are motion estimation correlated comprises determining whether one or more of the phase plane correlations indicates a strong correlation or a weak correlation based on at least one of a comparison of a difference between the maximal peak of the first phase plane correlation and an average value of the first phase plane correlation and a first threshold or a comparison of a difference between the maximal peak of the first phase plane correlation and a second largest peak of the first phase plane correlation and a second threshold.

4. The method of claim 1, wherein the first video frame and the second video frame are determined to be not motion estimation correlated when each of the plurality of phase plane correlations indicates a weak correlation, and wherein a first weak correlation for the first phase plane correlation of the plurality of phase plane correlations is determined based on at least one of a comparison of a difference between the maximal peak of the first phase plane correlation and an average value of the first phase plane correlation and a first threshold or a comparison of a difference between the maximal peak of the first phase plane correlation and a second largest peak of the first phase plane correlation and a second threshold.

5. The method of claim 1, wherein the first video frame comprises third regions and the second video frame comprises fourth regions, wherein the third regions and the fourth regions comprise local regions, and wherein determining whether the first video frame and the second video frame are motion estimation correlated is based on a comparison of a number of the plurality of local phase plane correlations between the third and fourth regions that indicate a weak correlation to a threshold.

6. The method of claim 5, wherein the threshold is adaptive based at least in part on whether the first video frame and the second video frame are motion estimation correlated.

7. The method of claim 6, wherein the frame prediction mode indicator comprises a fallback mode and the threshold is at a first value, wherein the total number of the plurality of global phase plane correlations and the plurality of local phase plane correlations that indicate a weak correlation is greater than the threshold, the method further comprising:
   decreasing the threshold from the first value to a second value.

8. The method of claim 1, wherein the plurality of phase plane correlations comprise global phase plane correlations, the method further comprising:
   dividing the first video frame into third regions and the second video frame into fourth regions corresponding to the third regions, wherein there are fewer first regions than third regions; and
   generating a plurality of local phase plane correlations, wherein each local phase plane correlation of the plurality of local phase plane correlations is based on a corresponding pair of third and fourth regions, wherein determining whether the first video frame and the second video frame are motion estimation correlated is based at least in part on the plurality of local phase plane correlations.

9. The method of claim 8, wherein the first video frame and the second video frame are determined to be not motion estimation correlated based on a comparison of each motion vector associated with each maximal peak of each of the plurality of global phase plane correlations and the plurality of local phase plane correlations to a threshold.

10. The method of claim 1, further comprising:
determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator.

11. The method of claim 10, further comprising:
determining a current fallback counter value based at least in part on the fallback type indicator and a previous fallback counter value, wherein:
if the fallback type indicator is the scene change indicator, the current fallback counter value is reset to zero,
if the fallback type indicator is the no fallback indicator, the current fallback counter value is decremented with respect to the previous fallback counter value, and
if the fallback type indicator is any one of the no motion indicator, the fast motion indicator, or the difficult scene indicator, the current fallback counter value is incremented with respect to the previous fallback counter value; and
determining the frame prediction mode indicator based on the current fallback counter value, wherein:
if the fallback counter is at a first threshold, the frame prediction mode indicator is set to a fallback mode,
if the fallback counter is at a second threshold that is less than the first threshold, the frame prediction mode indicator is set to a motion estimation mode, and
if the fallback counter is between the first and second thresholds, the frame prediction mode indicator is unchanged.

12. The method of claim 1, wherein determining an individual phase plane correlation of the plurality of phase plane correlations comprises:
applying a discrete Fourier transform to an individual first region and a corresponding second region;
determining a cross power spectrum between the transformed individual first region and the transformed corresponding second region;
applying an inverse discrete Fourier transform to the cross power spectrum; and
performing a Fast Fourier Transform shift on the inverse transformed cross power spectrum to generate the individual phase plane correlation.

13. The method of claim 1, wherein the frame prediction mode indicator comprises at least one of a motion estimation mode or a fallback mode, the method further comprising:
generating, if the frame prediction mode indicator comprises the motion estimation mode, a predicted frame based on at least one of the first frame or the second frame using motion estimation; and
generating, if the frame prediction mode indicator comprises the fallback mode, a second predicted frame based on at least one of repeating the first frame or the second frame or blending the first frame and the second frame.

14. A system for managing motion estimation on a computing device, comprising:
a display device configured to present a video sequence; and
a graphics processing unit coupled to the display device, wherein the graphics processing unit comprises:
regions generation circuitry configured to divide a first video frame of a video sequence into first regions and a second video frame of the video sequence into second regions corresponding to the first regions, wherein the first regions and the second regions comprise global regions;
phase plane correlation circuitry configured to generate a plurality of phase plane correlations, wherein each phase plane correlation of the plurality of phase plane correlations is based on a corresponding pair of first and second regions;
motion estimation correlation detection circuitry configured to determine whether the first video frame and the second video frame are motion estimation correlated based at least in part on the plurality of phase plane correlations, wherein the first video frame and the second video frame are determined to be not motion estimation correlated when any of the plurality of phase plane correlations indicates a fast motion, and wherein a first fast motion for a first phase plane correlation of the plurality of phase plane correlations is determined based on a comparison of a motion vector associated with a maximal peak of the first phase plane correlation and a threshold; and
frame prediction mode circuitry configured to provide a video frame prediction mode indicator based at least in part on the determination.

15. The system of claim 14, wherein the motion estimation correlation detection circuitry being configured to determine whether the first video frame and the second video frame are motion estimation correlated comprises the motion estimation correlation detection circuitry being configured to determine whether one or more of the phase plane correlations indicates a strong correlation or a weak correlation based on at least one of a comparison of a difference between the maximal peak of the first phase plane correlation and an average value of the first phase plane correlation and a first threshold or a comparison of a difference between the maximal peak of the first phase plane correlation and a second largest peak of the first phase plane correlation and a second threshold.

16. The system of claim 14, wherein the first video frame and the second video frame are determined to be not motion estimation correlated when each of the plurality of phase plane correlations indicates a weak correlation, and wherein a first weak correlation for the first phase plane correlation of the plurality of phase plane correlations is determined based on at least one of a comparison of a difference between the maximal peak of the first phase plane correlation and an average value of the first phase plane correlation and a first threshold or a comparison of a difference between the maximal peak of the first phase plane correlation and a second largest peak of the first phase plane correlation and a second threshold.

17. The system of claim 14, wherein the plurality of phase plane correlations comprise global phase plane correlations, wherein the regions generation circuitry is further configured to divide the first video frame into third regions and the second video frame into fourth regions corresponding to the third regions, wherein there are fewer first regions than third regions, wherein the phase plane correlation circuitry is further configured to generate a plurality of local phase plane correlations, wherein each local phase plane correlation of the plurality of local phase plane correlations is based on a corresponding pair of third and fourth regions, and wherein the motion estimation correlation detection circuitry is further configured to determine whether the first video frame and the second video frame are motion estimation correlated based at least in part on the plurality of local phase plane correlations.

18. At least one non-transitory machine readable medium comprising a plurality of instructions that in response to being executed on a computing device, cause the computing device to manage motion estimation by:

dividing a first video frame of a video sequence into first regions and a second video frame of the video sequence into second regions corresponding to the first regions, wherein the first regions and the second regions comprise global regions;

generating a plurality of phase plane correlations, wherein each phase plane correlation of the plurality of phase plane correlations is based on a corresponding pair of first and second regions;

determining whether the first video frame and the second video frame are motion estimation correlated based at least in part on the plurality of phase plane correlations, wherein the first video frame and the second video frame are determined to be not motion estimation correlated when any of the plurality of phase plane correlations indicates a fast motion, and wherein a first fast motion for a first phase plane correlation of the plurality of phase plane correlations is determined based on a comparison of a motion vector associated with a maximal peak of the first phase plane correlation and a threshold; and providing a video frame prediction mode indicator based at least in part on the determination.

19. The machine readable medium of claim 18, wherein the first video frame comprises third regions and the second video frame comprises fourth regions, wherein the third regions and the fourth regions comprise local regions, and wherein determining whether the first video frame and the second video frame are motion estimation correlated is based on a comparison of a number of the plurality of local phase plane correlations between the third and fourth regions that indicate a weak correlation to a threshold.

20. The machine readable medium of claim 19, wherein the threshold is adaptive based at least in part on whether the first video frame and the second video frame are motion estimation correlated.

21. The machine readable medium of claim 18, further comprising instructions that in response to being executed on a computing device, cause the computing device to manage motion estimation by:

determining a fallback type indicator based on determining whether the first video frame and the second video frame are motion estimation correlated, wherein the fallback type indicator comprises at least one of a no fallback indicator, a scene change indicator, a no motion indicator, a fast motion indicator, or a difficult scene indicator, wherein providing the frame prediction mode indicator is based at least in part on the fallback type indicator.

22. The machine readable medium of claim 21, further comprising instructions that in response to being executed on a computing device, cause the computing device to manage motion estimation by:

determining a current fallback counter value based at least in part on the fallback type indicator and a previous fallback counter value, wherein:

if the fallback type indicator is the scene change indicator, the current fallback counter value is reset to zero, if the fallback type indicator is the no fallback indicator, the current fallback counter value is decremented with respect to the previous fallback counter value, and if the fallback type indicator is any one of the no motion indicator, the fast motion indicator, or the difficult scene indicator, the current fallback counter value is incremented with respect to the previous fallback counter value; and determining the frame prediction mode indicator based on the current fallback counter value, wherein:

if the fallback counter is at a first threshold, the frame prediction mode indicator is set to a fallback mode, if the fallback counter is at a second threshold that is less than the first threshold, the frame prediction mode indicator is set to a motion estimation mode, and if the fallback counter is between the first and second thresholds, the frame prediction mode indicator is unchanged.

* * * * *